US012121482B1

(12) United States Patent
Galvan

(10) Patent No.: US 12,121,482 B1
(45) Date of Patent: Oct. 22, 2024

(54) APPARATUS FOR COUPLING A WHEELCHAIR AND A WALKER

(71) Applicant: Naun Galvan, Whittier, CA (US)

(72) Inventor: Naun Galvan, Whittier, CA (US)

( * ) Notice: Subject to any disclaimer, the term of this patent is extended or adjusted under 35 U.S.C. 154(b) by 0 days.

(21) Appl. No.: 18/404,805

(22) Filed: Jan. 4, 2024

(51) Int. Cl.
*A61G 5/14* (2006.01)
*A61G 5/12* (2006.01)

(52) U.S. Cl.
CPC ............... *A61G 5/14* (2013.01); *A61G 5/125* (2016.11)

(58) Field of Classification Search
CPC .................................. A61G 5/14; A61G 5/125
See application file for complete search history.

(56) References Cited

U.S. PATENT DOCUMENTS 2,556,121 A 6/1951 Thomas
3,398,974 A 8/1968 Edwards
3,584,890 A 6/1971 Presty
3,999,778 A 12/1976 Markiel
6,467,797 B1 * 10/2002 Lofy .................... A61G 5/1054 280/647
8,998,244 B2 4/2015 Purdue
9,351,901 B1 * 5/2016 Petsch ...................... A61H 3/00
9,655,806 B2 5/2017 Naucke
9,962,303 B1 5/2018 Wison
10,704,580 B2 7/2020 Bordenave
10,765,587 B2 * 9/2020 Gardner ................... A61H 3/04
2016/0367417 A1 * 12/2016 Ramirez .................. A61G 5/10
2018/0104133 A1 * 4/2018 Chen ....................... A61H 3/008
2018/0209459 A1 * 7/2018 Bordenave ............... A61G 5/10
2021/0196541 A1 * 7/2021 Derringer ................ A61G 5/14

FOREIGN PATENT DOCUMENTS

DE 20320197 U1 * 4/2004 ............ A63B 22/02

* cited by examiner

*Primary Examiner* — Jacob D Knutson
(74) *Attorney, Agent, or Firm* — Averill, Green & Kim; Philip Y Kim; K. L. Green

(57) ABSTRACT

Apparatus using two telescoping armrest connecting a wheelchair to a walker for safely assisting a patient regaining their ability to walk. Physical therapists use the walker to train patients on walking to build strength, endurance, and balance. The telescoping armrest provide a fixed gap between the wheelchair and walker and keeps the wheelchair close to the patient. The patient can easily sit in the wheelchair, and the presence of the wheelchair minimizes the risk of falling, allows the patient to rest when fatigued, provides a sense of security, and eliminates a need for an assistance to push the wheelchair behind the patient.

4 Claims, 3 Drawing Sheets

APPARATUS FOR COUPLING A WHEELCHAIR AND A WALKER

BACKGROUND OF THE INVENTION

The present invention relates to physical therapy and in particular to attachments from a walker to a wheelchair to assist a patient practicing walking to prevent falls and to rest when fatigued.

Stroke victims and other patients go through an often long and difficult recovery therapy process required to regain strength and control of muscles. One of the most difficult and important aspects of recovery is recovering the ability to walk. Physical therapists often use walkers to train patients on walking to build strength, endurance, and balance.

The limitations in using a traditional walker is that if a patient's legs buckle while using a traditional walker the patient will have no support and the patient will fall; or even if a therapist or a caregiver is helping the patient, the sudden fall may also injure the therapist or the caregiver while in the act of trying to prevent the patient from falling.

Another commonly used device for walking is a rollator walker. This device is different from a traditional walker in that it has wheels, a seating platform and hand breaks that lock wheels in place. It is used in a similar fashion as a traditional walker in which the patient will push the rollator walker to hold themselves up by holding on to the handgrip platform. The limitations with this device is that if a patient is about to fall, the patient will first need to lock the hand breaks to lock the wheels from moving. After that, the patient will need to turn around to properly sit. Unfortunately it often requires too many steps to take for someone who is about to fall.

In another method of rehabilitation, a therapist or a caregiver is escorting a patient on a walker with one hand on a gait belt and with the other hand pulling a wheelchair behind the patient. This can cause additional injury to both the patient and the caregiver. If a patient is about to fall, a caregiver will need to keep the patient from falling with one hand while simultaneously trying to pull up the wheelchair and catch the falling patient. This takes too many steps to make in a split second to keep the patient from falling.

BRIEF SUMMARY OF THE INVENTION

The present invention addresses the above and other needs by providing an apparatus connecting a wheelchair to a walker for safely assisting a patient regaining their ability to walk. Physical therapists use the walker to train patients on walking to build strength, endurance, and balance. The present invention provides a fixed gap between the wheelchair and walker and keeps the wheelchair close to the patient. The patient can easily sit in the wheelchair, and the presence of the wheelchair minimizes the risk of falling, allows the patient to rest when fatigued, provides a sense of security, and eliminates a need for an assistance to push the wheelchair behind the patient.

In accordance with one aspect of the invention, there is provided a pair of wheelchair armrest attachments comprising an armrest member and a telescoping extension member. Said armrest member further comprising a horizontal member attached to two vertical wheelchair legs distanced to securely fit the armrest member to the wheelchair. The horizontal member having equidistant receiving holes. Said telescoping extension member further comprising a male connector member which is inserted into a receiving attachment. Said receiving attachment is attached to the vertical walker legs of the walker. The receiving attachment having a receiving end and an attachment end. Said attachment end configured to securely attach the receiving attachment to the vertical walker legs.

The telescoping member can be adjusted to set a desired distance between the walker and the wheelchair.

BRIEF DESCRIPTION OF THE SEVERAL VIEWS OF THE DRAWING

The above and other aspects, features and advantages of the present invention will be more apparent from the following more particular description thereof, presented in conjunction with the following drawings.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Where the terms "about" or "generally" are associated with an element of the invention, it is intended to describe a feature's appearance to the human eye or human perception, and not a precise measurement.

Figure 1:
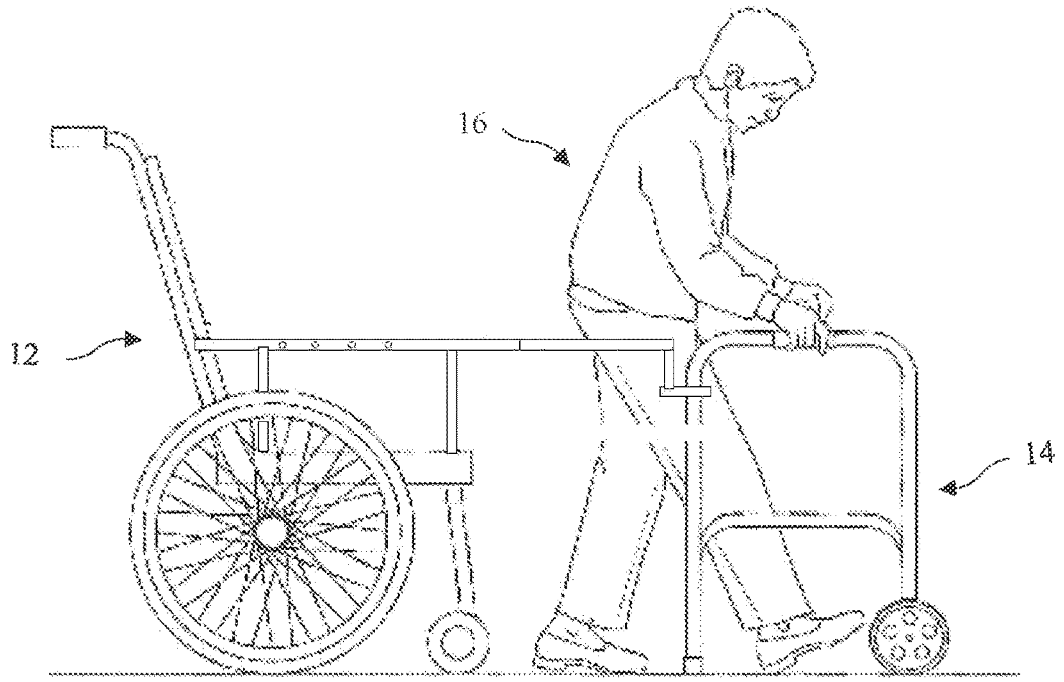
FIG. 1 shows a patient walking between a wheelchair and walker connected by a telescoping armrest according to the present invention.
Figure 2:
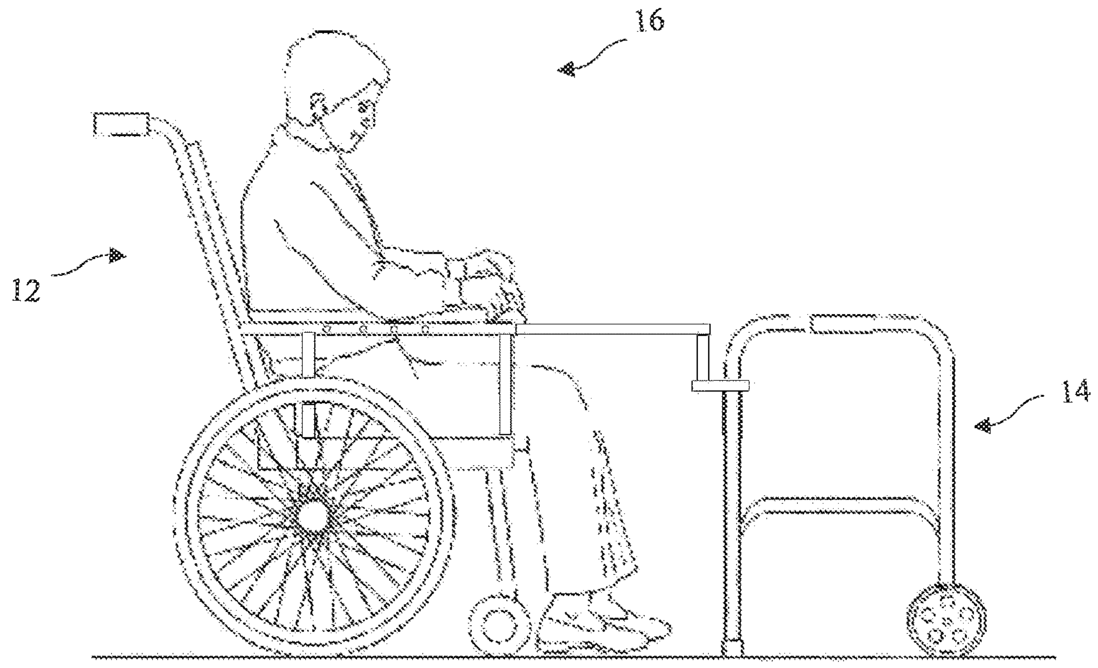
FIG. 2 shows the patient seated in the wheelchair connected to the walker by the telescoping armrest according to the present invention.

A patient 16 is shown walking between a wheelchair 12 and a walker 14 connected by two coupling apparatuses 20 according to the present invention is shown in FIG. 1 and the patient 16 seated in the wheelchair 12 connected to the walker 14 by the coupling apparatuses 20 is shown in FIG. 2. Coupling the wheelchair 12 to the walker 14 allows physical therapists, occupational therapists, and patients/family members to assist the patient 16 while practicing walking and standing with minimal risk of falling and allows the patient 16 to rest when tired in conjunction use of the walker 14.

Figure 3A:
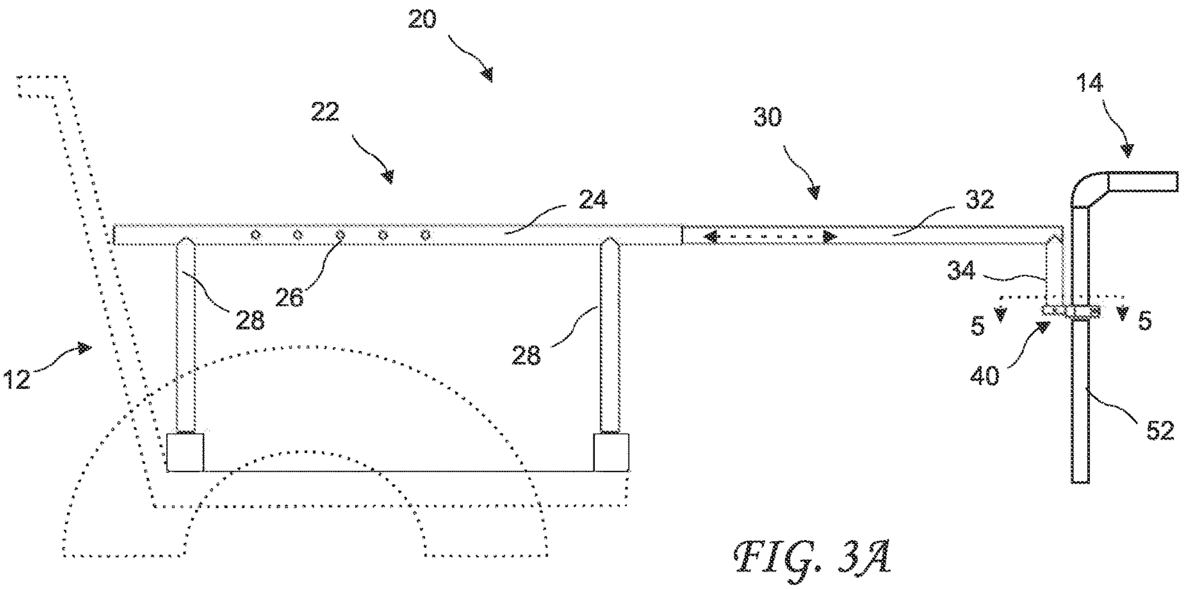
FIG. 3A shows a side view of the telescoping armrest attached to the walker according to the present invention.
Figure 3B:
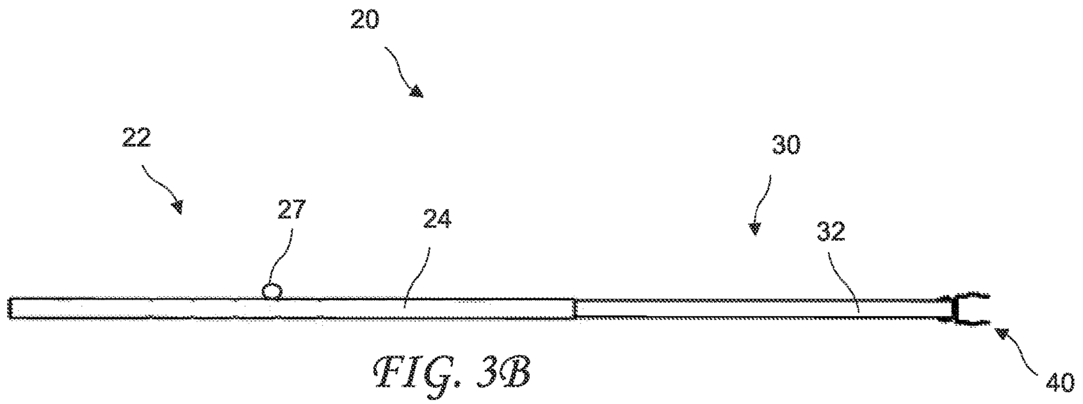
FIG. 3B shows a top view of the telescoping armrest according to the present invention.

A side view of the coupling apparatuses 20 is shown in FIG. 3A, and a top view of the coupling apparatuses 20 is shown in FIG. 3B. The coupling apparatuses 20 comprising an armrest member 22 and a telescoping extension member 30. The armrest member 22 further comprising a horizontal armrest 24 having receiving holes 26 alignable with to lock the telescoping extension member 30 and the armrest member to a desired distance between the wheelchair and the walker, and a plurality of vertical wheelchair legs 28, preferably having two legs 28. Said telescoping extension member 30 further including a horizontal member 32 and a vertical member 34 attached downward at the end of the horizontal member 32. A spring loaded locking knob 27 engages the holes 26 to lock the separation of the walker from the wheel chair.

Figure 3C:
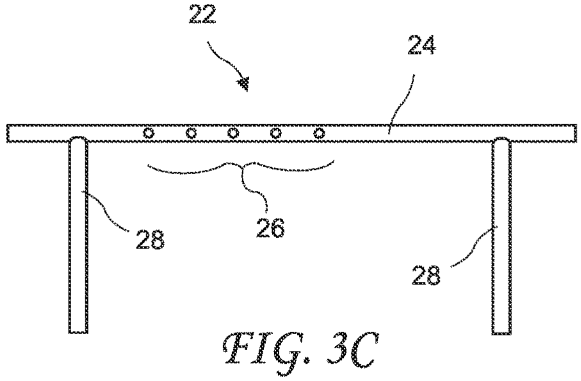
FIG. 3C shows a side view of an armrest member of the coupling apparatuses, according to the present invention.
Figure 3D:
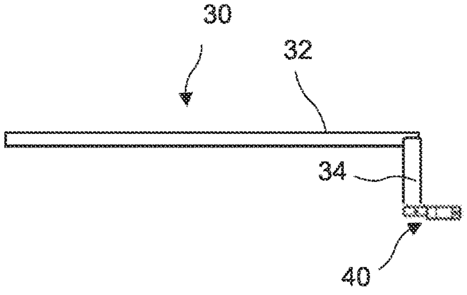
FIG. 3D shows a side view of a telescoping extension member of the coupling apparatuses, according to the present invention.

FIG. 3C shows a side view of an armrest member 22 of the coupling apparatuses 20, and FIG. 3D shows a side view of a telescoping extension member 30 of the coupling apparatuses 20. The armrest member 22 includes the horizontal armrest 24 and two vertical wheelchair legs 28. The telescoping extension member 30 includes the horizontal member 32, the vertical member 34, and the receiving attachment 40.

Figure 4:
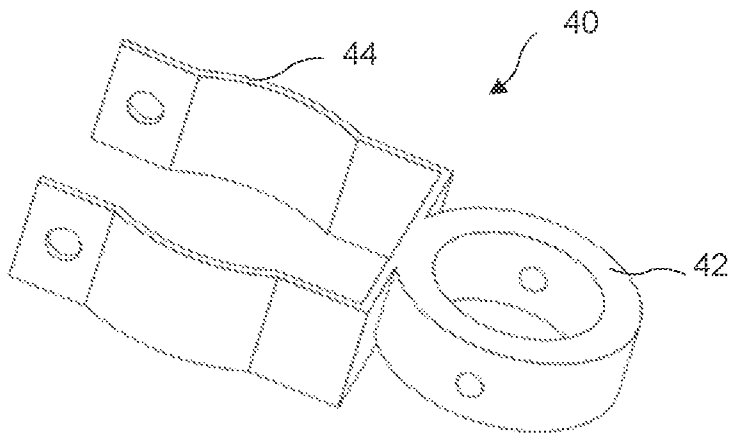
FIG. 4 shows an isometric view of the receiving attachment according to the present invention.

A receiving attachment 40 is shown in FIG. 3A and FIG. 4. The receiving attachment 40 comprising a receiving end 42 and an attachment end 44. The receiving end 42 receives the vertical member 34 of the telescoping extension member 30.

Figure 5:
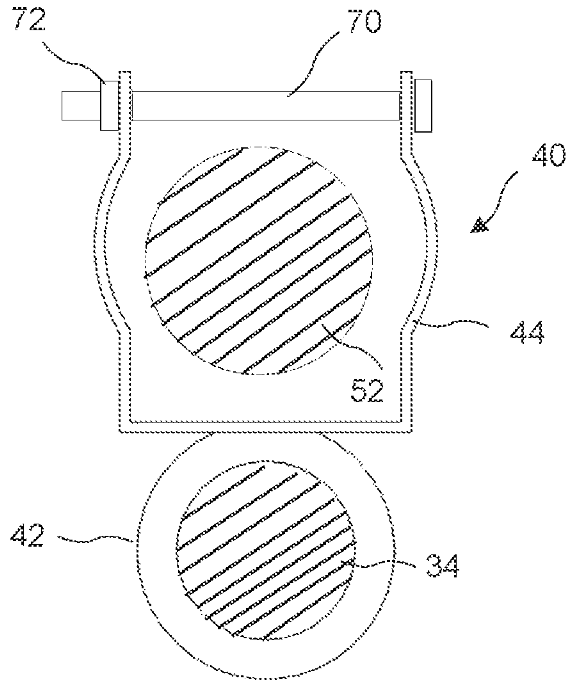
FIG. 5 shows a cross-sectional view of the receiving attachment attached to a vertical walker leg and receiving a vertical member of the telescoping armrest, taken along line 5-5 of FIG. 3A, according to the present invention.

FIG. 5 shows one embodiment of the walker 14, wherein the receiving attachment 40 is attached to the walker leg 52 at the attachment end 44 by a screw 70 and a nut 72. The vertical member 34 securely fits into the receiving end 42. The receiving end 42 of the receiving attachment 40 and the vertical member 34 of the telescoping extension 30 may have round or rectangular cross-sections.

In one embodiment of the present invention, the receiving attachment 40 is attached to the walker leg 52 at the attachment end 44 by a screw 70 and a nut 72 as shown in FIG. 5. The vertical member 34 securely fits into the receiving end 42 as shown in FIG. 5.

While the invention herein disclosed has been described by means of specific embodiments and applications thereof, numerous modifications and variations could be made thereto by those skilled in the art without departing from the scope of the invention set forth in the claims.

I claim:

1. A wheelchair and walker coupling apparatus comprising:

- an armrest member comprising;
  - a horizontal armrest; and
  - two vertical wheelchair legs configured to engage a wheelchair;
- a telescoping extension member comprising:
  - a horizontal member telescopingly engaging the horizontal armrest;
  - a vertical member, and
  - a receiving attachment attached to the vertical member;
- the receiving attachment includes a receiving end configured to tightly engage the vertical member; and
- the receiving attachment includes an attachment end configured to engage a vertical walker leg of a walker,
- wherein the attachment end of the receiving attachment includes a screw and nut to tighten on the vertical walked leg of the walker.

2. The coupling apparatus of claim 1, wherein the receiving end of the receiving attachment is sized to firmly receive the vertical member of the telescoping extension.

3. The coupling apparatus of claim 1, wherein the receiving end of the receiving attachment and the vertical member of the telescoping extension member may have round or rectangular cross-sections.

4. The coupling apparatus of claim 1, wherein the horizontal armrest includes holes and a spring loaded locking knob engages the horizontal member through the holes to hold a separation of the wheelchair and walker.

* * * * *